United States Patent
Kitchin et al.

(10) Patent No.: US 8,998,558 B2
(45) Date of Patent: Apr. 7, 2015

(54) VEHICLE WHEELCHAIR LIFT

(75) Inventors: Steven Lee Kitchin, Fort Wayne, IN (US); Kraig James Schlosser, Columbia City, IN (US)

(73) Assignee: Mobility SVM, LLC, Fort Wayne, IN (US)

( * ) Notice: Subject to any disclaimer, the term of this patent is extended or adjusted under 35 U.S.C. 154(b) by 469 days.

(21) Appl. No.: 12/887,931

(22) Filed: Sep. 22, 2010

(65) Prior Publication Data

US 2011/0070057 A1 Mar. 24, 2011

Related U.S. Application Data

(60) Provisional application No. 61/245,419, filed on Sep. 24, 2009.

(51) Int. Cl.
*B60P 1/00* (2006.01)
*A61G 3/06* (2006.01)
*A61G 7/10* (2006.01)

(52) U.S. Cl.
CPC *A61G 3/06* (2013.01); *A61G 3/062* (2013.01); *A61G 7/1042* (2013.01); *A61G 2203/726* (2013.01); *Y10S 414/134* (2013.01)

(58) Field of Classification Search
USPC .............. 414/544, 541, 921, 545; 29/426.2; 280/124.128, 6.15, 6.151, 6.152; 296/25, 65.04, 26.04

See application file for complete search history.

(56) References Cited

U.S. PATENT DOCUMENTS

| | | | |
|---|---|---|---|
| 1,902,499 A * | 3/1933 | Herreshoff | 49/366 |
| 3,034,619 A * | 5/1962 | Glasgow et al. | 192/223 |
| 3,710,962 A | 1/1973 | Fowler, Jr. | |
| 3,874,527 A | 4/1975 | Royce | |
| 3,941,261 A * | 3/1976 | Ricci | 414/537 |
| 4,140,230 A | 2/1979 | Pearson | |
| 4,325,668 A * | 4/1982 | Julian et al. | 414/546 |
| 4,408,948 A | 10/1983 | Robinson | |
| 4,551,060 A * | 11/1985 | Quercy | 414/541 |
| 4,661,035 A * | 4/1987 | Danielsson | 414/550 |
| 4,778,328 A | 10/1988 | Apgar | |
| 4,847,972 A | 7/1989 | Anderson et al. | |

(Continued)

FOREIGN PATENT DOCUMENTS

| | | |
|---|---|---|
| CA | 1087555 | 10/1980 |
| DE | 26 17 754 | 11/1977 |

(Continued)

OTHER PUBLICATIONS

Foreign patent document with English language abstract.

(Continued)

*Primary Examiner* — Saul Rodriguez
*Assistant Examiner* — Glenn Myers
(74) *Attorney, Agent, or Firm* — Faegre Baker Daniels LLP

(57) ABSTRACT

The present invention provides a compact wheelchair lift mechanism useable within a relatively small vehicle cabin space, such as a pickup truck with an extended cabin. The wheelchair lift includes a lateral actuator and a vertical actuator that cooperate to move a wheelchair support laterally in and out of a vehicle cabin and vertically between the cabin floor and the ground. The vehicle includes a lowered floor for expanding the vertical opening available to the lift, wheelchair, and vehicle occupant. The lift is positioned within the vehicle cabin such that no loss of seating capacity results from the installation of the lift.

15 Claims, 11 Drawing Sheets

(56) References Cited

U.S. PATENT DOCUMENTS

| | | | |
|---|---|---|---|
| 4,984,955 A | 1/1991 | McCullough | |
| 5,052,879 A | 10/1991 | Wolfe | |
| 5,096,361 A * | 3/1992 | Crawford | 414/462 |
| 5,261,779 A | 11/1993 | Goodrich | |
| 5,308,214 A * | 5/1994 | Crain et al. | 414/541 |
| 5,401,135 A | 3/1995 | Stoen et al. | |
| 5,524,952 A | 6/1996 | Czech et al. | |
| 5,540,539 A | 7/1996 | Wolfman et al. | |
| 5,542,811 A * | 8/1996 | Vartanian | 414/541 |
| 5,556,250 A | 9/1996 | Fretwell et al. | |
| 5,564,884 A | 10/1996 | Farsai | |
| 5,672,041 A | 9/1997 | Ringdahl et al. | |
| 5,674,043 A | 10/1997 | Dorn | |
| 5,769,480 A * | 6/1998 | Gebhardt | 296/65.12 |
| 5,806,632 A | 9/1998 | Budd et al. | |
| 5,809,833 A * | 9/1998 | Newport et al. | 74/89.37 |
| 5,944,473 A | 8/1999 | Saucier et al. | |
| 6,071,064 A * | 6/2000 | Hackett | 414/545 |
| 6,082,957 A * | 7/2000 | Kupka, Jr. | 414/540 |
| 6,086,314 A | 7/2000 | Savarin | |
| 6,190,112 B1 * | 2/2001 | Danilovic | 414/541 |
| 6,203,265 B1 * | 3/2001 | Cohn et al. | 414/537 |
| 6,357,992 B1 | 3/2002 | Ringdahl et al. | |
| 6,379,102 B1 | 4/2002 | Kameda | |
| 6,726,435 B1 | 4/2004 | Williams et al. | |
| 7,284,944 B1 | 10/2007 | Schlangen | |
| 7,347,658 B2 | 3/2008 | Schlangen | |
| 7,625,038 B2 * | 12/2009 | Moccio et al. | 296/208 |
| 7,845,703 B2 * | 12/2010 | Panzarella et al. | 296/65.11 |
| 2001/0026756 A1 | 10/2001 | Mortimore | |
| 2004/0184906 A1 | 9/2004 | Dupuy et al. | |
| 2004/0254050 A1 * | 12/2004 | Morgan | 482/122 |
| 2004/0256827 A1 | 12/2004 | Watters | |
| 2005/0105995 A1 | 5/2005 | Freet et al. | |
| 2006/0255640 A1 * | 11/2006 | Kusanagi et al. | 297/344.21 |
| 2009/0162175 A1 | 6/2009 | Pearson | |
| 2010/0054900 A1 | 3/2010 | Houtveen et al. | |

FOREIGN PATENT DOCUMENTS

| | | |
|---|---|---|
| FR | 2 726 182 | 5/1996 |
| JP | 63-270225 | 11/1988 |
| JP | 5-221259 | 8/1993 |
| JP | 2004-210020 | 7/2004 |
| WO | 92/10422 | 6/1992 |

OTHER PUBLICATIONS

International Search Report and Written Opinion dated Jul. 12, 2011 in PCT/US2010/049803.

* cited by examiner

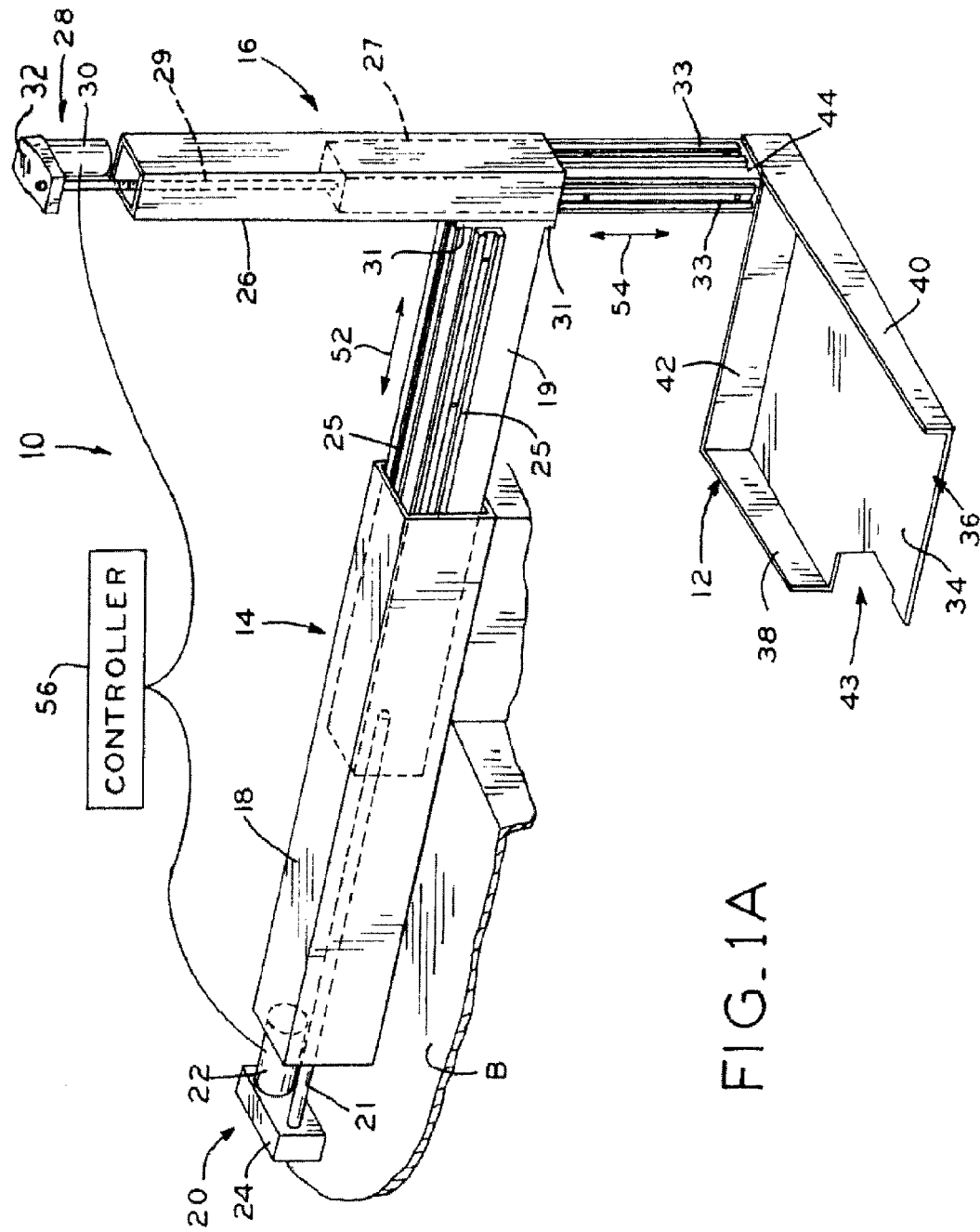
FIG_1A

VEHICLE WHEELCHAIR LIFT

CROSS REFERENCE TO RELATED APPLICATIONS

This application claims the benefit under 35 U.S.C. §119(e) of U.S. Provisional Patent Application Ser. No. 61/245,419, filed Sep. 24, 2009.

BACKGROUND

1. Technical Field

The present disclosure relates to wheelchair lifts. More particularly, the present disclosure relates to wheelchair lifts for use with passenger vehicles, and to a method for using the same.

2. Brief Description of the Related Art

Many persons who use wheelchairs are licensed to operate motor vehicles. Generally, the operator and the wheelchair must enter and exit the vehicle with the assistance of a lift mechanism which lifts the vehicle operator and wheelchair from the ground and into the vehicle cabin. Once inside, the operator can maneuver into a driver's position. Existing wheelchair lift assemblies require extensive modification to the vehicle, and have parts which extend outside the vehicle, i.e., into the undercarriage area. These protruding parts significantly impact the aesthetics and ground clearance of the vehicle. Further, these traditional wheelchair lifts are not compatible with 4-wheel drive vehicles because they occupy space in the undercarriage normally reserved for 4-wheel drive systems such as transfer cases.

SUMMARY

The present invention provides a compact wheelchair lift mechanism useable within a relatively small vehicle cabin space, such as an extended cabin of a pickup truck. The wheelchair lift includes a lateral actuator and a vertical actuator that cooperate to move a wheelchair support laterally in and out of a vehicle cabin and vertically between the cabin floor and the ground. The vehicle includes a lowered floor for expanding the vertical opening available to the lift, wheelchair, and vehicle occupant. The lift is positioned within the vehicle cabin such that no loss of seating capacity results from the installation of the lift.

Smaller and/or compact wheelchair lift systems are desirable to reduce the required cabin size for lift operation and to increase the potential wheelchair size accommodated by the lift. Further, minimizing the extent to which wheelchair lift systems protrude beyond the standard vehicle profile, i.e., below the standard vehicle undercarriage, helps to retain the preexisting aesthetic and performance characteristics of the vehicle into which the lift is installed.

In one embodiment thereof, the present invention provides a wheelchair lift system comprising: a vehicle having a vehicle body including a floor, a passenger side and a driver side, an opening formed in at least one of the passenger and driver sides, the vehicle body defining a vehicle cabin accessible by the opening, the cabin having front and rear seats contained therein; a lateral actuator arm laterally extendable with respect to the vehicle body, the lateral actuator arm moveable between an extended position and a retracted position, the lateral actuator arm disposed underneath the rear seat in the vehicle cabin when the lateral actuator arm is in the retracted position; a vertical actuator arm coupled to the lateral actuator arm, the vertical actuator arm moveable between the extended position and the retracted position such that the vertical actuator arm is disposed outside the vehicle cabin in the extended position and inside the vehicle cabin in the retracted position, the vertical actuator arm vertically slidable with respect to the lateral actuator arm between a raised position and a lowered position; and a wheelchair support coupled to the vertical actuator arm, the wheelchair support positioned inside the vehicle when the lateral actuator arm is in the retracted position and the vertical actuator arm is in the raised position, the wheelchair support positioned outside the vehicle when the lateral actuator arm is in the extended position and the vertical actuator arm is in the lowered position.

In one aspect, the above embodiment may further include a lowered floor assembly on at least one of the passenger side and the driver side, the lowered floor increasing a vertical clearance as compared to the floor of the vehicle body.

In another embodiment thereof, the present invention provides a wheelchair lift system comprising: a vehicle including a vehicle frame and a vehicle body including a floor, a passenger side and a driver side, an opening formed in at least one of the passenger and driver sides, the vehicle body defining a vehicle cabin accessible by the opening, the cabin having front and rear seats contained therein. The wheelchair lift system further comprises: a lowered floor assembly on at least one of the passenger side and the driver side of the vehicle body, the lowered floor increasing a vertical clearance as compared to the floor of the vehicle body, the lowered floor offset downwardly as compared to the floor of the vehicle body, the lowered floor establishing a gap between the vehicle body and the vehicle frame; spacers disposed between the vehicle body and the frame, the spacers sized to span the gap; and a wheelchair lift coupled to the vehicle body, the wheelchair lift having a raised and retracted configuration and a lowered and extended configuration, whereby a wheelchair supported by the wheelchair lift is disposed inside the vehicle cabin when the wheelchair lift is in the raised and retracted configuration, and the wheelchair supported by the wheelchair lift is disposed outside the vehicle cabin when the wheelchair lift is in the lowered and extended configuration.

In yet another aspect thereof, the present invention provides a method of installing a wheelchair lift into a vehicle, the method comprising: removing a front door and a rear door from at least one of a passenger side and a driver side of the body; cutting away at least a portion of at least one of a passenger floor and a driver floor of the vehicle body to create a cutaway space; raising the vehicle body off of the vehicle frame to create a gap between the body and the frame; inserting spacers sized to span the gap between the body and frame; installing a lowered floor in the cutaway space, the lowered floor spanning the gap between the body and the frame, the lowered floor adapted to receive the wheelchair; mounting a lateral actuator inside the body, the lateral actuator positioned to extend laterally from the vehicle body; mounting a vertical actuator to the lateral actuator such that the vertical actuator is extendable from inside the vehicle body to outside the vehicle body; fusing the removed front and rear doors to create a single side door; coupling the single side door to the lateral actuator; and coupling a wheelchair tray to the vertical actuator such that the wheelchair tray is moveable between a lowered position adjacent the ground and a raised position proximate the lowered floor.

BRIEF DESCRIPTION OF THE DRAWINGS

The above-mentioned and other features and advantages of this invention, and the manner of attaining them, will become more apparent and the invention itself will be better understood by reference to the following descriptions of an embodiment of the invention taken in conjunction with the accompanying drawings, wherein:

FIG. 1A is a perspective view of a wheelchair lift in accordance with the present disclosure, illustrated in the extended and lowered position;

Corresponding reference characters indicate corresponding parts throughout the several views. The exemplifications set out herein illustrate preferred embodiments of the invention and such exemplifications are not to be construed as limiting the scope of the invention in any manner.

DETAILED DESCRIPTION

Referring generally to FIGS. 1A-6B, wheelchair lift 10 in accordance with an exemplary embodiment of the invention is provided for transporting a person in a wheelchair from a location on ground G at the side of vehicle V (FIGS. 4 and 5) to the inside of the cabin of vehicle V. As discussed in sections 1 and 2, wheelchair lift 10 is designed for minimal impedance into the cabin space of vehicle V, such that little or no loss of vehicle occupancy results from the installation of lift 10. A method for installing wheelchair lift 10 is also provided in section 3. The method modifies an otherwise "factory stock" passenger vehicle to provide additional vertical space within the cabin of vehicle V. This additional vertical space accommodates lift 10 and facilitates the compatibility of vehicle V with large wheelchairs and/or tall vehicle occupants. Front and rear vehicle doors are fused and mounted to lift 10 to move laterally away from the vehicle as a single unit, thereby creating a large, unimpeded access point for the wheelchair, wheelchair user, vehicle passengers and cargo. The finished combination of vehicle V and wheelchair lift 10 provides a vehicle having an undiminished appearance and functionality compared to a factory stock vehicle, but that is also able to accommodate even a large wheelchair with a tall user.

Referring now to FIG. 6A, for purposes of the present disclosure, vehicle V is considered to have a "front," "rear," "passenger side" and "driver side" in accordance with United States convention. A longitudinal axis A of vehicle V extends from front to rear and is generally equidistant from the passer and driver sides of vehicle V. The "lateral" direction is defined as a direction generally transverse to longitudinal axis A and generally toward or away from the driver or passenger sides.

Referring still to FIG. 6A, a structure comparatively closer to axis A is considered to be "inside" or "inner" compared to a structure comparatively farther away from axis A. Conversely, the farther structure may be said to be "outside" or "outer" compared to the closer structure.

Although lift 10 is shown and discussed as being installed on the driver side of vehicle V, it is contemplated that the passenger side is equally amenable to use of lift mechanism 10, or that lift mechanism 10 may be installed on both driver and passenger sides of vehicle V.

1. Wheelchair Lift Mechanism

Figure 1B:
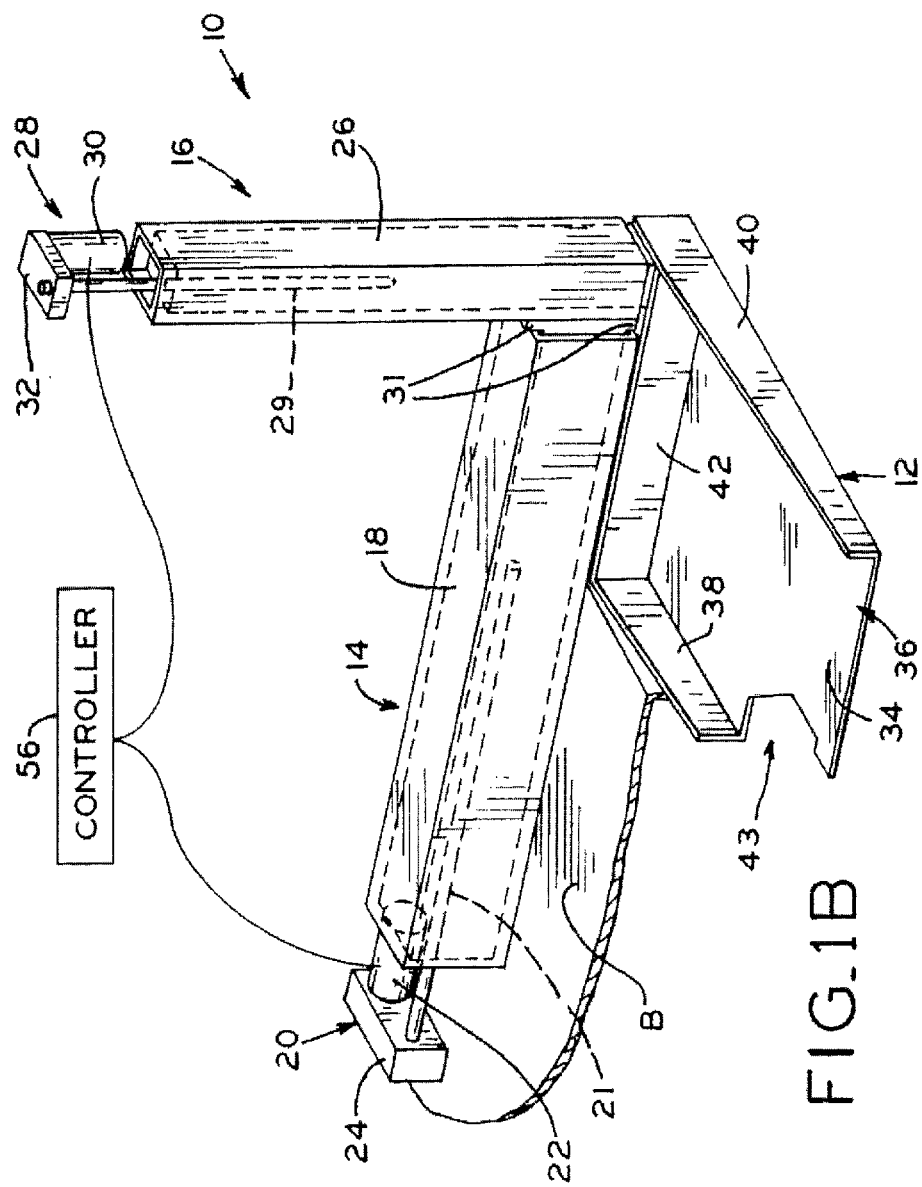
FIG. 1B is a perspective view of the wheelchair lift shown in FIG. 1A, illustrated in the raised and retracted position.
Figure 4:
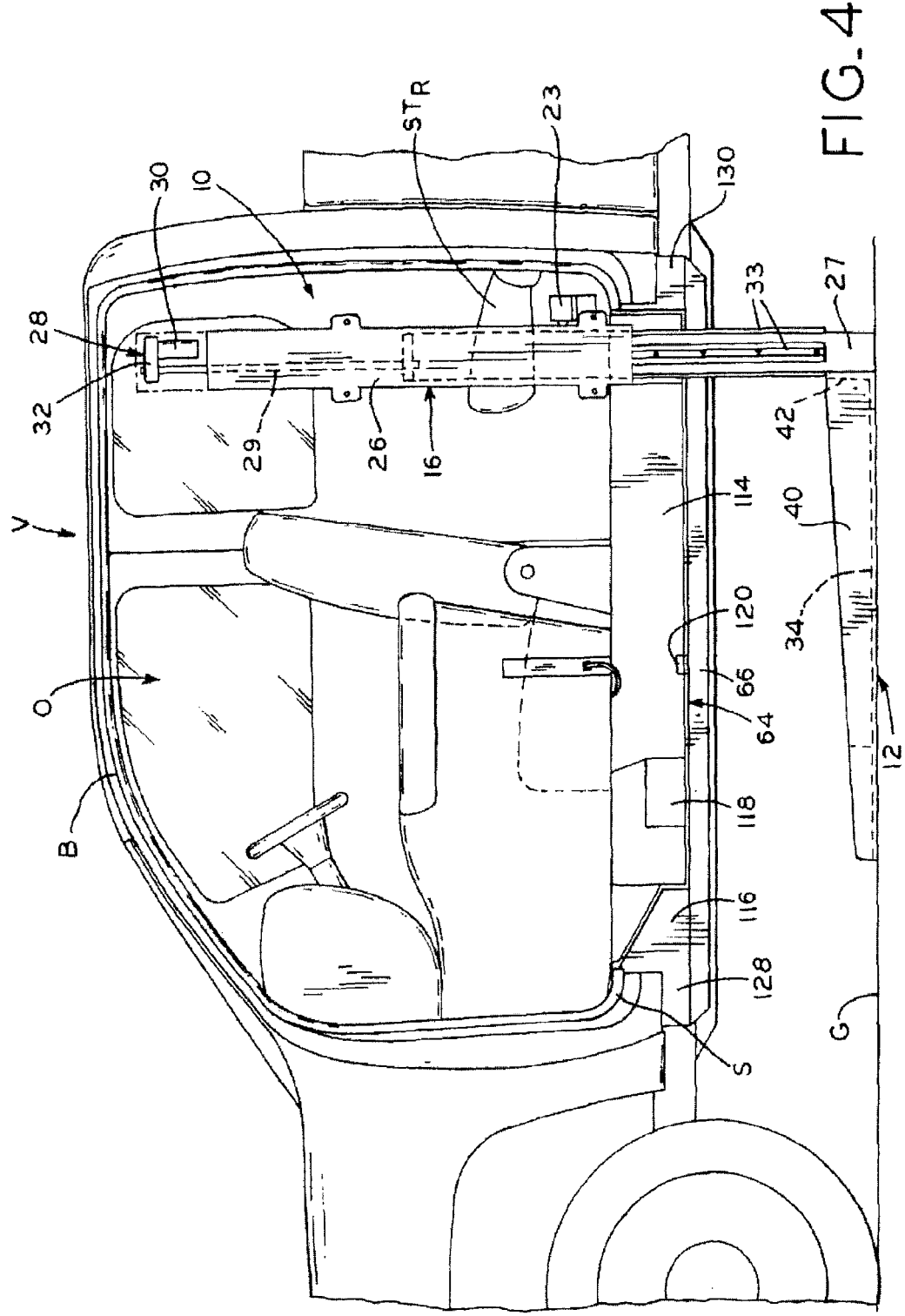
FIG. 4 is a side elevation view of the wheelchair lift shown in FIG. 1A installed in the cabin of a vehicle.
Figure 5:
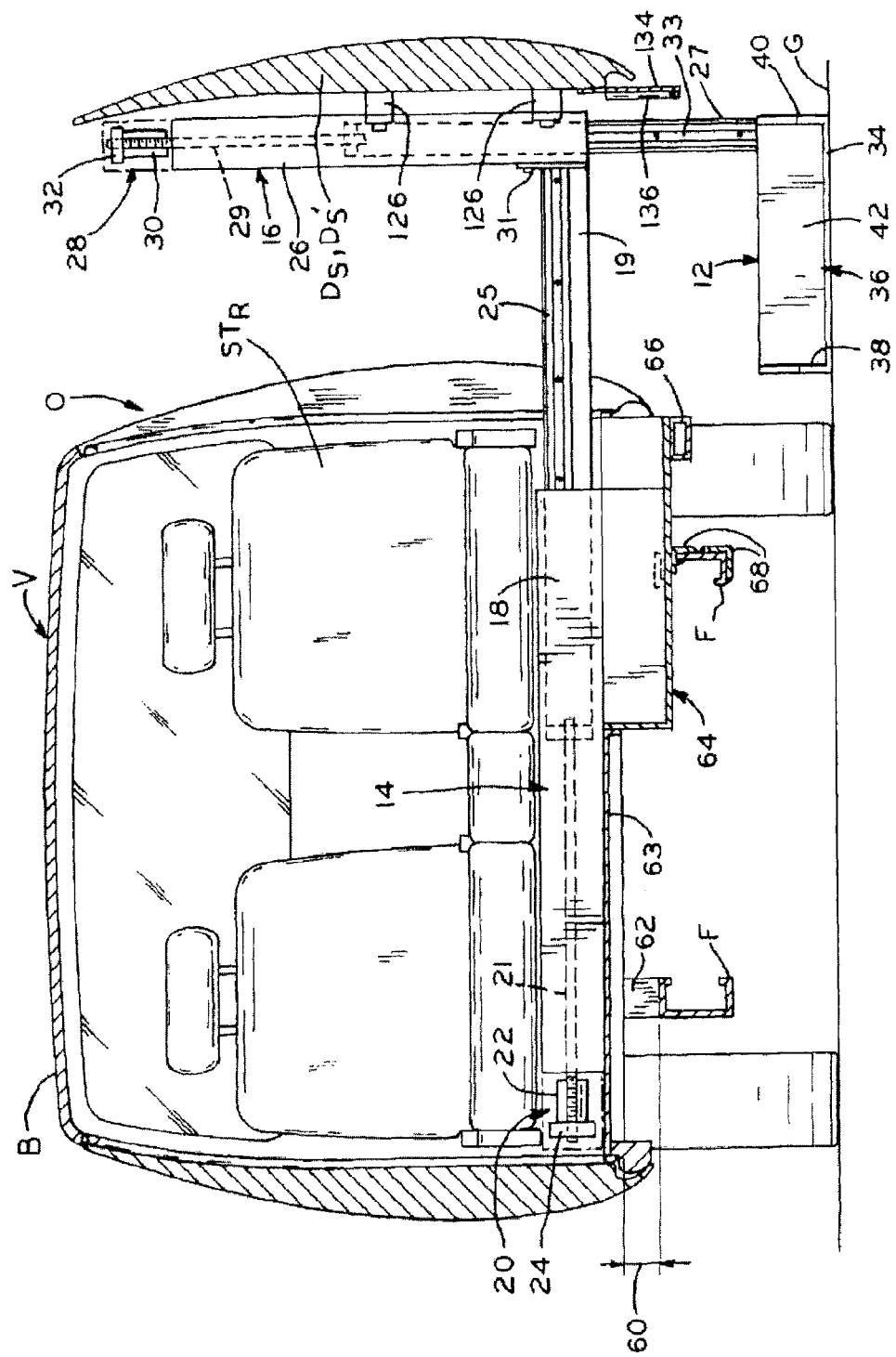
FIG. 5 is a front elevation view of the wheelchair lift and vehicle shown in FIG. 4.
Figure 6:
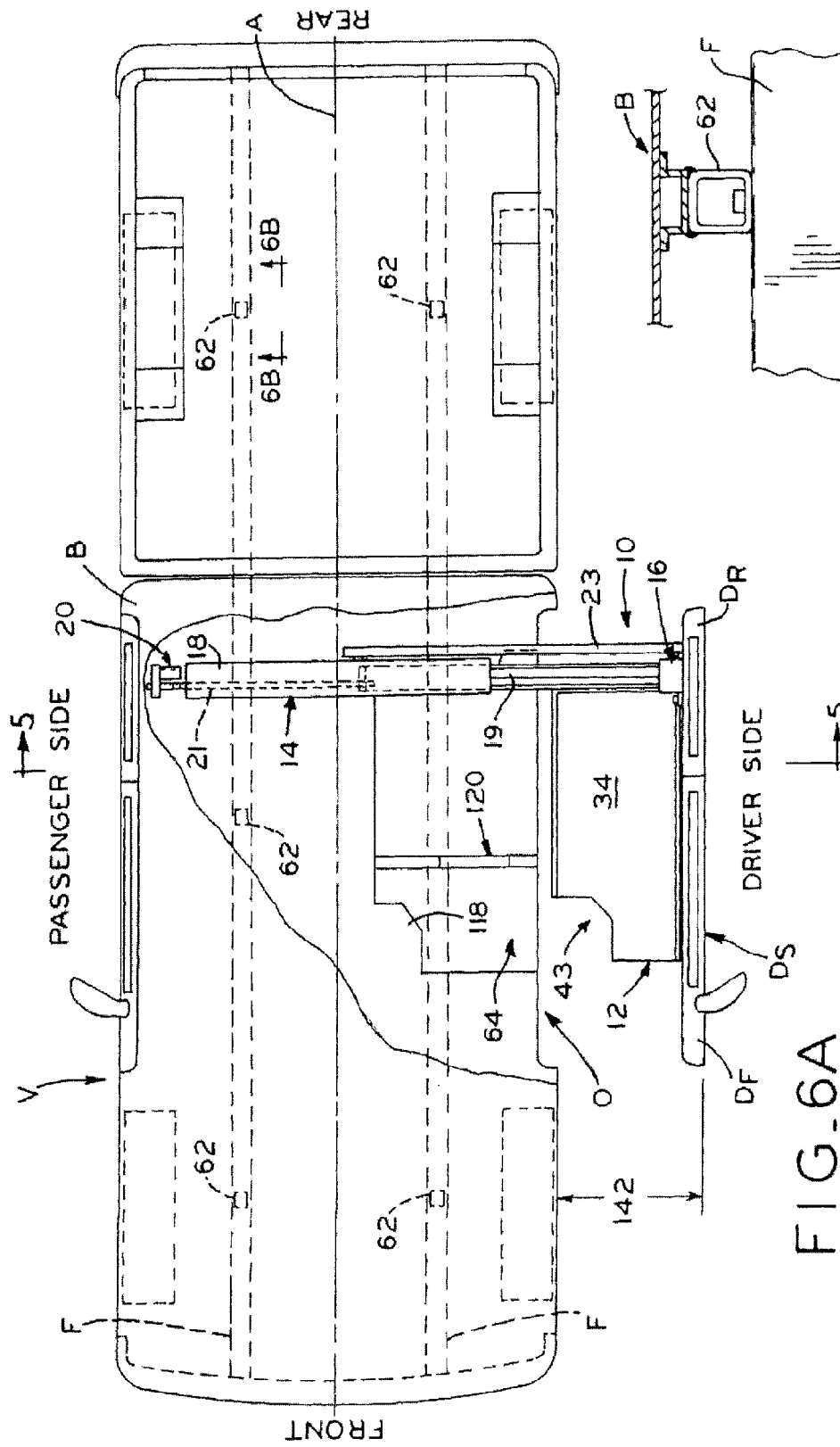
FIG. 6A is a top plan view of the wheelchair lift and vehicle shown in FIG. 4.
FIG. 6B is a partial section, side elevation view of the vehicle shown in FIG. 4, illustrating a spacer disposed between the vehicle body and the vehicle frame.

As shown in FIGS. 1A and 1B, wheelchair lift 10 includes wheelchair support platform 12, lateral actuator assembly 14 and vertical actuator assembly 16. Wheelchair support platform 12 is attached to vertical actuator assembly 16 and moves generally up or down upon actuation of vertical actuator 16. Lateral actuator 14 is fixed directly to the floor on the inside of a vehicle cabin, as described below. Vertical actuator 16 is attached to a movable end of lateral actuator assembly 14, such that vertical actuator assembly 16 is moved side to side (i.e., "laterally") when lateral actuator assembly 14 is activated. When a person seated in a wheelchair is supported on wheelchair support platform 12, vertical actuator assembly 16 raises or lowers the person and wheelchair between ground level G and lowered floor 64 of vehicle V, as shown in FIGS. 4 and 5. When vertical actuator assembly 16 is in the raised position, the bottom surface of wheelchair support platform 12 is at or above floor 64 of vehicle V, enabling lateral actuator assembly 14 to translate the person and wheelchair between the inside and outside of the cabin of vehicle V.

In the exemplary embodiment illustrated in FIGS. 1A and 1B, lateral actuator assembly 14 includes actuator housing 18 and a single actuator arm 19 slidably received within housing 18. In an exemplary embodiment, housing 18 and arm 19 are tubes each having a square cross section, with arm 19 small enough to be received in housing 18 with clearance for slider bearings 25 between each of the four pairs of tube walls (as described below). However, it is contemplated that housing 18 and arm 19 may take a variety of forms within the scope of the present disclosure, such as cylinder-in-cylinder arrangements, I-beam- and roller arrangements, plates slidably coupled to one another, and the like. Moreover, housing 18 may be any structure adapted to cooperate with arm to constrain arm 19 to sliding motion with respect to housing 18.

Figure 7:
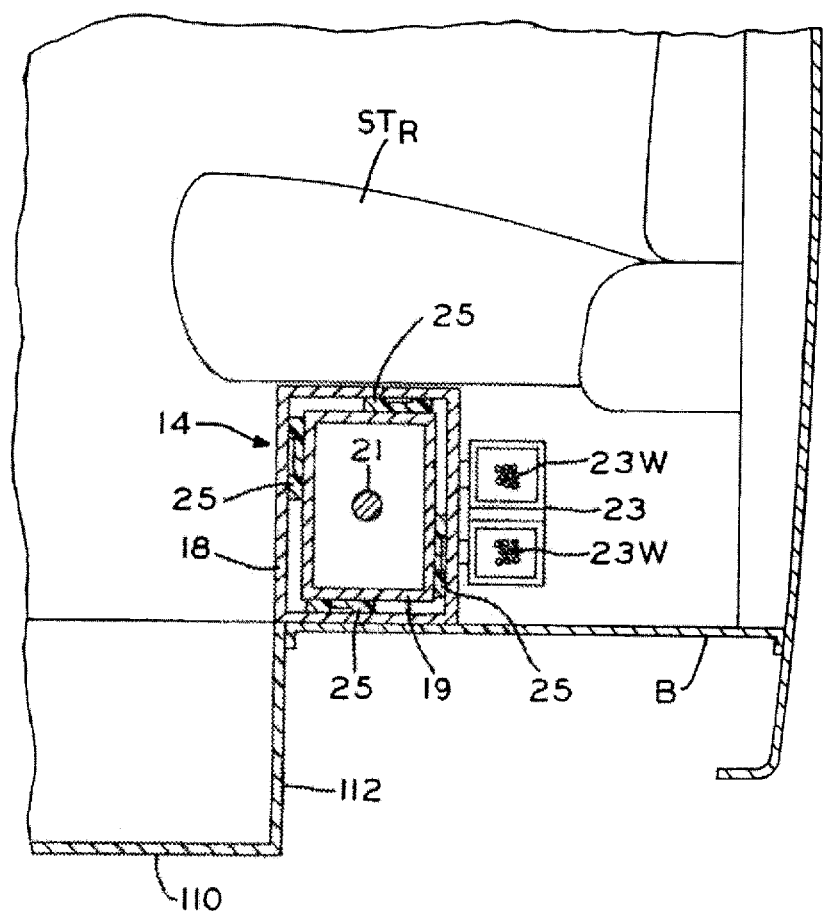
FIG. 7 is a partial section, side elevation view of the wheelchair lift shown in FIG. 1A, illustrating a lateral actuator assembly.

Actuator arm 19 is moveable along path 52 (FIG. 1A) between a retracted position (FIG. 1B) and an extended position (FIG. 1A). The motive force for movement of actuator arm 19 is provided by actuator drive 20, which includes lead screw 21 coupled to arm 19 via a lead screw bushing (not shown), motor 22 coupled to housing 18 and/or vehicle body B, and transmission 24 for transmitting power from motor 22 to lead screw 21. Referring to FIG. 7, lead screw 21 is disposed within lateral actuator arm 19, which advantageously protects lead screw 21 from the surrounding environment while facilitating the placement of slider bearings 25.

Slider bearings 25 are attached to each side of arm 19 and disposed in the space between arm 19 and housing 18 to facilitate smooth movement between the extended and retracted positions. In an exemplary embodiment, bearings 25 are strips of ultra-high molecular weight (UHMW) plastic running the entire length of arm 19, though it will be appreciated that other materials and arrangements may be also be used within spirit and scope of the present disclosure. Bearings 25 are strategically placed on arm 19 to accommodate torque on rod arm 19 arising from the weight of support platform 12 and any vehicle occupant supported thereon. As shown in FIG. 7, the forward bearing 25 is disposed near the top of arm 19, while the aft bearing is disposed near the bottom. Similarly, the top bearing 25 is disposed at the aft side of arm 19, while the bottom bearing is at the forward side. With bearings 25 so disposed, the bearings are ideally placed at points of high pressure arising from the moment created by the weight of platform 12, the entirety of which is forward of arm 19.

In alternative embodiments, lateral actuator assembly may take other forms. For example, although the illustrated embodiment utilized a "worm drive" type linear actuator, with motor 22 rotating a screw to produce linear motion of actuator arm 19, the lateral actuator assembly may be any other linear actuation device, such as a hydraulic cylinder, a pneumatic actuator, or the like. Arm 19, shown as a single arm extending from housing 18, may alternatively use multiple arms extending from one another in a well known "telescoping" type arrangement. In yet another embodiment, an "off-the-shelf" actuator assembly is available as part number MA-811058512-32 from Venture Manufacturing Co. in Dayton, Ohio.

Vertical actuator assembly is constructed similarly to lateral actuator assembly, except that vertical actuator housing 26 is oriented substantially perpendicularly to lateral actuator housing 18. Vertical actuator housing 26 is driven by vertical actuator drive 28, so that vertical actuator arm 27 extends from and retracts into housing 26 along path 54 (FIG. 1A). The motive force for vertical actuator arm 26 is provided by vertical actuator 28, which includes vertical lead screw 29 coupled to arm 27 via a lead screw bushing (not shown), vertical actuator motor 30 coupled to housing 26, and vertical actuator transmission 32 for transmitting power from motor 30 to lead screw 29. Slider bearings 33 are attached to vertical actuator arm 27 for smooth sliding motion between housing 26 and arm 27 in similar fashion to lateral slider bearings 21 discussed above. However, bearings 33 may be centered on respective faces of arm 27, because the moment arm and torque discussed above with respect to lateral actuator assembly 14 are not similarly manifested in vertical actuator assembly 16. Vertical actuator may also include an auxiliary brake (not shown) for mechanically preventing movement of vertical actuator arm 27 with respect to housing 26. This brake, if provided, ensures against downward "drift" of arm 27 when a person is supported upon platform 12.

In an exemplary embodiment, vertical actuator assembly 16 is substantially the same as lateral actuator assembly 14, with different lengths of extension and retraction as necessary for adaptation to a particular vehicle. As noted above with respect to lateral actuator assembly 14, it is contemplated that lateral actuator assembly 14 and/or vertical actuator assembly 16 may be any known system capable of moving wheelchair support platform 12 laterally or vertically, respectively, between the inside of the vehicle cabin and the ground. It is also contemplated that vertical and lateral actuator assemblies 14, 16 may be angled somewhat with respect to the vertical and horizontal directions, and with respect to each other as required or desired for a particular application.

Lateral actuator assembly 14 is coupled to vertical actuator assembly 16 via coupling flanges 31. More particularly, lateral actuator arm 19 is coupled to vertical housing 26 so that lateral actuator drive 20 drives vertical actuator assembly 16 and support platform 12 toward and away from vehicle V (as discussed below). Coupling flanges 31 fix the end of arm 19 to a bottom portion of housing 26 to prevent any motion or sliding of housing 26 with respect to arm 19.

Referring to FIG. 7, an "energy chain" or wire carrier 23 may be attached to the rear portion of lateral actuator assembly to carry wire bundle 23W, which may include wires from the vehicle power source (not shown) to vertical actuator motor 30, for example. In addition to wires specially added for control of wheelchair lift 10, wire bundle 23W may also include rerouted wires originally installed in vehicle V, including wires originally routed near door hinges and/or underneath the original floor of vehicle body B. As described herein, fused door assembly $D_S$ is not hinged to vehicle body B after installation of wheelchair lift 10, but instead moves laterally between open and closed positions. In addition, lowered floor 64 is disposed closer to frame F than the original floor, leaving less clearance for wires that may previously have been routed through that space. Thus, various wires originally routed through the door hinges or under the original floor are instead added to wire bundle 23W and routed through carrier 23. As actuator motor 30 moves with respect to the rest of vehicle V when lateral actuator 14 drives vertical actuator 16, the wire bundle 23W follows the movement of motor 30.

Wheelchair support platform 12 includes an upwardly-facing support surface 34 that is bounded around a portion of its perimeter by inside wall 38, outside wall 40 and rear stop wall 42, with open side 36 at the front of platform 12. Inboard and outboard walls 38, 40 help to guide a wheelchair onto support platform 12 and to aid in maintaining the wheelchair on support surface 34. Rear wall 42 limits the rearward motion of the wheelchair, thereby preventing the wheelchair from falling or rolling off the back of support platform 12. Support surface 34 and inside wall 38 may optionally include cutout 43 sized and shaped to accommodate drive train components within the cabin of vehicle V, such as a 4-wheel drive transfer case as discussed in detail below. Support platform 12 is fixed to vertical actuator arm 27 at attachment point 44 (FIG. 1A) by any suitable method, such as by bolting, welding or the like.

Figure 3:
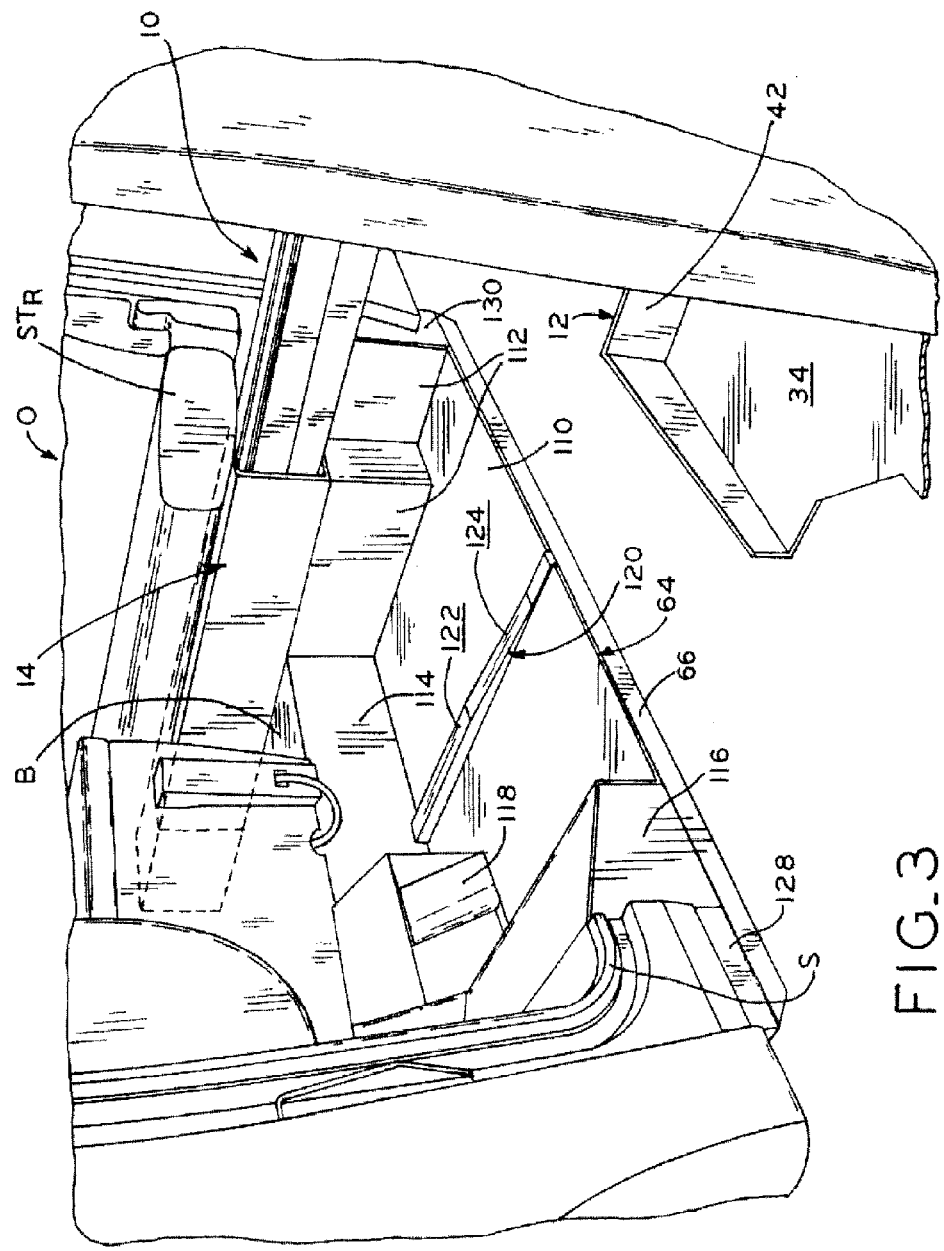
FIG. 3 is a partial perspective view of the wheelchair lift shown in FIG. 1A installed in the cabin of a vehicle, illustrating a lowered floor in the vehicle body.

As best seen in FIGS. 1A, 1B and 3, lateral actuator assembly 14 is mounted to vehicle body B within the cabin of a vehicle V. In the illustrated embodiment, lateral actuator assembly 14 is mounted to the original floor of vehicle body B, generally behind the vehicle operator. Advantageously, an as best seen in FIG. 7, lateral actuator assembly 14 fits underneath factory-standard rear passenger seats $ST_R$, such that no little or no passenger space is sacrificed by the installation of lift mechanism 10 within the cabin of vehicle V. Thus, the seating capacity of vehicle V is substantially undiminished as compared to a comparable unmodified vehicle.

Turning now to FIG. 5, and as also discussed in detail below with respect to a method of installation for wheelchair lift 10, vehicle body B is raised from vehicle frame F to accommodate wheelchair lift 10. The total vertical distance by which body B is raised is represented by reference numeral 60. Appropriately sized spacers 62 span the resultant gap between passenger side floor 63 (which is part of the original vehicle body B) and vehicle frame F on the passenger side. As discussed below, lowered floor assembly 64 is installed at the driver side, and is designed to rest in close proximity (but not in contact with) to the cutaway portion of frame F at the driver side. Thus, the total vertical space available to the wheelchair within the cabin of vehicle V is increased by distance 60. This increased vertical space aids in accommodating large wheelchairs and/or tall operators. Additional support, such as reinforcement 66, may be installed under driver's side floor 64 for extra support of vehicle body B and to enhance rigidity of the vehicle and lift-related components surrounding enlarged driver access opening O.

As best seen in FIGS. 5 and 6A, front and rear vehicle doors $D_F$, $D_R$ are fused together to form a single, large, unitary vehicle door $D_S$ (as discussed in detail below). Door $D_S$ is affixed to vertical actuator assembly 16. Thus, vehicle door $D_S$ moves laterally together with vertical actuator 16 and wheelchair support platform 12 (together with any vehicle operator received thereon) when lateral actuator is activated. In addition to the vertical enlargement of vehicle opening O discussed above, the fusing doors $D_F$, $D_R$ to create one large door $D_S$ also creates enlarged opening O in front a front-to-rear perspective. As discussed in below, the resulting opening O cooperates with wheelchair lift 10 to confer several advantages upon users of vehicle V.

2. Wheelchair Lift Mechanism Use and Operation

A vehicle operator with a wheelchair accesses vehicle V by actuating lateral and vertical actuator assemblies 14, 16 to move wheelchair support platform 12 from an inside position to an outside position. In the inside position, platform 12 rests upon lowered floor 64 with door $D_S$ is a closed position. In the outside position, platform 12 is planted firmly on ground G next to vehicle V, as shown in FIGS. 4 and 5.

Controller 56 (FIGS. 1A and 1B) is connected to motors 22, 30 to control actuator assemblies 14, 16 respectively according to inputs or commands issued by the operator. The operator issues an "open door" signal or command to controller 56, such as by using a remote control or a control panel mounted on or in vehicle V (such as to door $D_S$), to execute an ingress routine programmed in controller 56 to open door $D_S$.

Controller 56 initiates the ingress routine by firing solenoid valves to release the door from front and rear latches holding door $D_S$, and then activating lateral actuator motor 22 to extend actuator arm 19 along path 52, which simultaneously unseats door $D_S$ from opening O. Once lateral actuator assembly 14 has moved wheelchair support platform 12 sufficiently far to allow inboard wall 38 to clear the outermost portion of lowered floor 64 (see FIG. 6A), controller 56 receives a signal from a switch or sensor near lateral actuator 14 (such as a limit switch or proximity switch, for example). In response to this signal, the controller deactivates lateral actuator motor 22 and activates vertical actuator motor 30 to lower wheelchair support platform 12 from the level of lowered floor 64 to the level of ground G near vehicle V. Controller 56 deactivates motor 30 when it receives a signal indicating that platform 12 has reached ground G, such as through a limit switch.

With support platform 12 is securely on the ground, the operator may wheel his or her wheelchair onto support surface 34 via open end 36. In the embodiment illustrated in FIGS. 4 and 5, the operator will wheel his or her wheelchair onto wheelchair support platform 12 backwards until the wheels of the wheelchair contact stop wall 42 and the forward most portion of the wheelchair is aft of open end 36. With the wheelchair so positioned on support surface 34, the wheelchair may be secured to wheelchair support platform 12 by any conventional securing means, such as straps, wheel locks, belts, clips or the like.

The operator then issues a "close door" signal or command to controller 56, such as via a remote or vehicle mounted panel, which initiates a second sequence of the ingress routine. Upon receiving the "close door" command, controller 56 activates motor 30 to raise vertical actuator arm 27 along path 54 to a retracted position (FIG. 1B) within housing 26. As with the lowered position, a limit switch or other sensor may be positioned to send a signal to controller 56 indicating that vertical actuator 14 has reached the raised position. With the vertical actuator assembly in such raised position, the bottom face of wheelchair support platform 12 is raised high enough to clear lowered floor 64. In this position, wheelchair support platform 12, vertical actuator assembly 16 and the operator and wheelchair are ready to be received within the cabin of vehicle V. In response to this "platform raised" signal, controller 56 deactivates vertical actuator motor 30 and activates lateral actuator motor 22 to draw lateral actuator arm 19 to a retracted position along path 52. The retracted position is again indicated by a switch or sensor signal within housing 18, which prompts controller 56 to deactivate lateral actuator motor 30. When lateral actuator assembly 14 is in the retracted position, door $D_S$ is received within and seated against the corresponding opening O in the frame of vehicle V. Normally-closed, solenoid-opened front and rear latches (not shown, noted above) secure door $D_S$ in the closed position. Advantageously, using both front and rear latches for door $D_S$ enhances the safety of vehicle V and minimizes wind noise while vehicle V is underway.

The operator can exit vehicle V by initiating an "egress" routine of controller 56 in a similar manner. The egress routine operates as the reverse of the ingress routine.

3. Manufacture/Installation of the Wheelchair Lift Mechanism

As noted above, vehicle V is prepared to receive wheelchair lift 10 by raising vehicle body B with respect to vehicle frame F, and lowering the floor of vehicle body B in the area where support platform 12 of wheelchair lift 10 is to be located when wheelchair lift 10 is in the raised and retracted configuration. In the illustrated embodiment, a pickup truck having an extended cab (FIG. 2A) or a crew cab (FIG. 2B) is the subject of the vehicle modifications described herein. Typical extended cab pickup truck models have a full-size front door $D_F$ (FIG. 2A), opening toward the front of the vehicle, and a smaller-size rear door $D_R$ which opens toward the rear of the vehicle. On the other hand, crew cab pickup truck models typically have full-size front and rear doors $D_F'$, $D_R'$ (FIG. 2B) which both open toward the front of the vehicle and have central pillar P disposed therebetween. Such pickup trucks have the advantage of being easily modifiable in the manner described below, while also having interior dimensions (i.e., cabin height and rear seat position) which accommodate wheelchair lift 10 and a wide variety of wheelchairs and wheelchair users.

However, it is contemplated that other vehicles may be used in accordance with the present disclosure. Any vehicle combining a) sufficient space behind the front row seats (i.e., driver and front passenger seats) with either b) a vehicle frame and body adaptable to the lifting and floor modification as discussed below or c) a sufficiently tall interior space to obviate the need to additional vertical clearance within the cabin, is a candidate for installation of wheelchair lift mechanism 10. For example, it is contemplated that, in addition to pickup trucks as described herein, sport utility vehicles and other suitably sized vehicles may be used. Further, while the present disclosure is directed to an installation method and system for "body-on-frame" vehicles such as trucks and larger sport-utility vehicles, it is also contemplated that the present disclosure may be adapted to "unibody" type vehicles such as cars, wagons and smaller sport utility vehicles.

Figure 9:
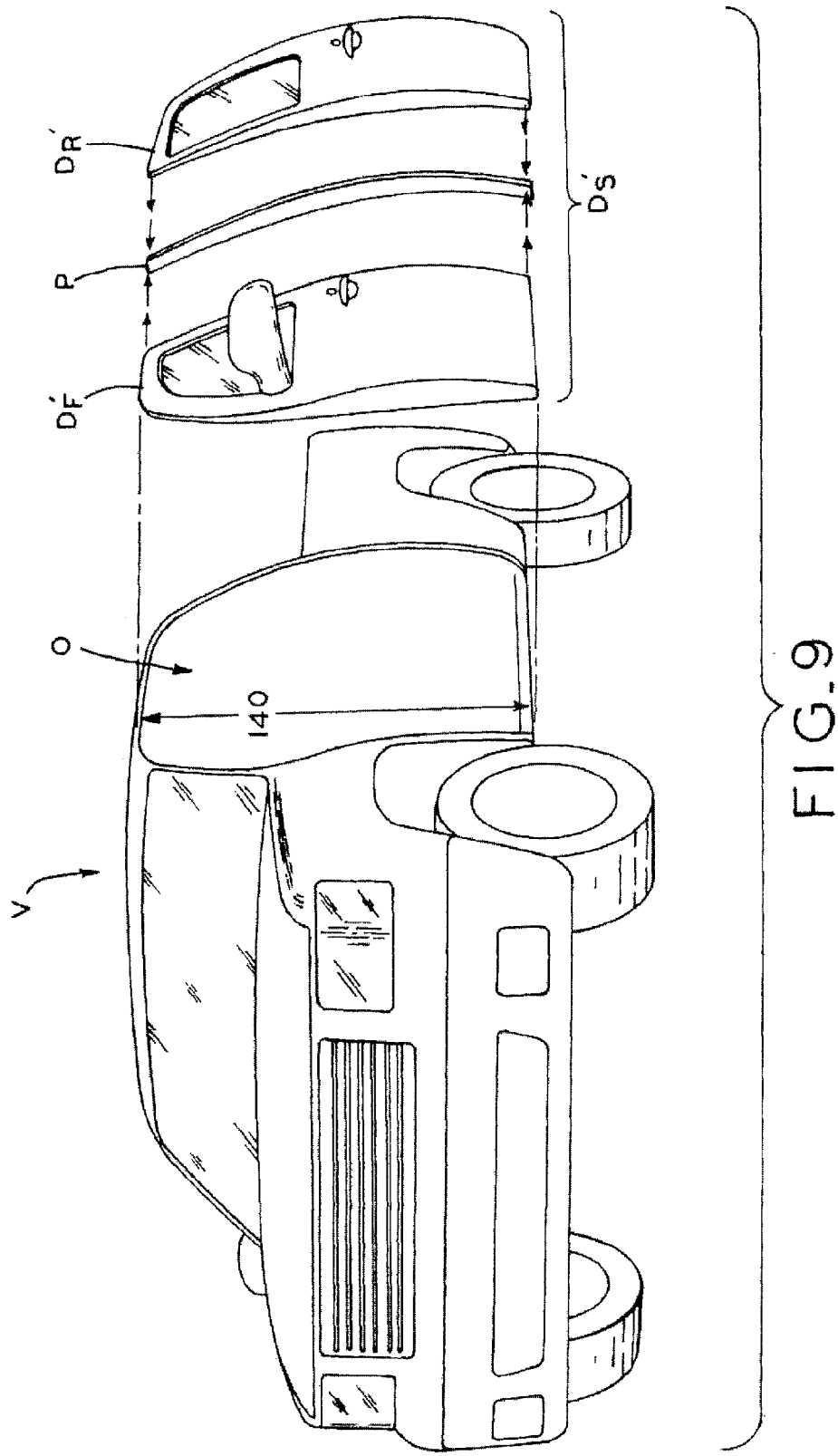
FIG. 9 is a perspective view of a vehicle prepared to receive a lift mechanism in accordance with the present disclosure, illustrating the fusion of front and rear doors.

Prior to beginning modification of vehicle V to accept wheelchair lift 10, the interior seats and upholstery may be removed from the vehicle cabin to protect the aesthetics and integrity of the fabric or other covering material thereof. Next, vehicle body V is disconnected from vehicle frame F in accordance with conventional methods. The front and rear doors ($D_F$, $D_R$ for an extended cab vehicle or $D_F'$, $D_R'$ for a crew cab vehicle) are removed from vehicle body B and set aside for later fusing, as described below. Referring to FIG. 9, central pillar P may be disposed between front and rear doors $D_F'$, $D_R'$, as is frequently the case for crew cab type vehicles. Where central pillar P is present, it is cut away from opening O in vehicle body B at this time and also set aside for later fusing of doors $D_F'$, $D_R'$.

With opening O of vehicle body B now fully exposed, at least a portion of the preexisting floor of vehicle body B is removed. In an exemplary embodiment, this removal step is performed by cutting away substantially all of the floor material occupying the driver's and/or passenger's side of vehicle V in the front seating row area. Thus, the cutaway portion extends from opening O to the first physical impediment to further cutting near the center of the vehicle (such as a center console or drive train components), or at the center itself if no such impediment exists. For 4-wheel drive vehicles, the interior terminus of the cutout will typically be adjacent to drive train components near the center of the vehicle, such as the drive shaft or transfer case for the 4-wheel drive system. For 2-wheel drive vehicles, the cutout may extend further inwardly in the absence of 4-wheel drive system components.

At the forward edge, the cutouts may come to the footrest/pedal area, as shown in FIG. 3, to obviate the need for any modification of systems and/or wiring in the front dashboard area and around the standard vehicle control pedals. In some cases, standard vehicle pedals may be removed, although in many cases the pedals will be retained to preserve regular functionality of vehicle V for drivers who do not use a wheelchair.

Referring still to FIG. 3, the floor cutout may extend as far back as the mounting point for lateral actuator assembly 14, which is mounted to the preexisting floor of vehicle body B under the rear passenger seats, as discussed above. Advantageously, creating a maximum cutout area to receive wheelchair support platform 12 allows a large size platform 12 to be used, which therefore facilitates compatibility of vehicle V and wheelchair lift 10 with even the largest commercially available motorized wheelchairs. Of course, it is contemplated that a smaller cutout may be used as required or desired for a particular application.

With the floor cutout procedure complete, lowered floor assembly 64 (FIG. 3) may be installed into the cutaway space created by the floor cutout procedure. In an exemplary embodiment as best shown in FIG. 3, lowered floor 64 includes deck 110, rear and side walls 112, 114, and front step 116, which provides a transition between the stock vehicle floor near the control pedals and lowered floor 64. The components of floor assembly are fixed to one another via any suitable method, such as welding. Optionally, lowered floor assembly 64 may also include transfer case guard 118, which accommodates a 4-wheel drive transfer case and/or other drive train components. In an exemplary embodiment, guard 118 is removably attached to lowered floor 64 to facilitate access to the drive train components behind guard 118, such as for maintenance or inspection. As noted above, wheelchair support platform 12 may also include cutout 43 to accommodate guard 118 when wheelchair lift 10 is in the raised and retracted configuration. Of course, transfer case guard 118 and cutout 43 may not be necessary for 2-wheel drive vehicles, particularly rear-wheel drive vehicles such as pickup trucks.

Floor assembly 64 may further include platform ramp 120, which is contacted by support platform 12 as lateral actuator assembly 14 draws platform 12 into the cabin of vehicle V. Advantageously, platform ramp 120 provides support surface 122, upon which wheelchair support platform 12 rests when inside the cabin of vehicle V. Ramp surface 124 ensures that wheelchair platform 12 will smoothly enter the cabin of vehicle V regardless of slight discrepancies in the height of support platform 12, which may occur due to varying amounts of weight supported by platform 12. In an exemplary embodiment, ramp surface 124 and support surface 122 have strips of low-friction material, such as UHMW, attached thereto to promote smooth movement of platform 12 over ramp 120. In addition to providing such smooth movement, ramp 120 also provides support for platform 12 when wheelchair lift 10 is in the raised and retracted position, thereby easing the load Lowered floor assembly 64 is installed on vehicle body B in place of the previously cutaway floor. In an exemplary embodiment, back and side walls 112, 114 abut the cutaway edges and are welded thereto. Similarly, front step 116, if present, is welded to the abutting original floor material remaining on vehicle body B. Transfer case guard 118 may be removably attached to lowered floor 64, as noted above, at this stage of assembly. With floor assembly 64 thus securely and sealingly mated to vehicle body B, reinforcement 66 is added. Referring still to FIG. 3, reinforcement 66 spans opening O such that reinforcement 66 can be attached, such as by welding, to both the original structure of vehicle body B at the fore and aft ends of opening O and to the entire fore/aft extents of deck 110 and front step 116. More particularly, reinforcement 66 is welded to original structure 128 of vehicle body B at the forward end, and to original structure 130 at the aft end. In an exemplary embodiment, reinforcement 66 is a steel tube structure, which is a readily available reinforcing member. Of course, any suitable shape and material may be used for reinforcement 66.

Figure 8:
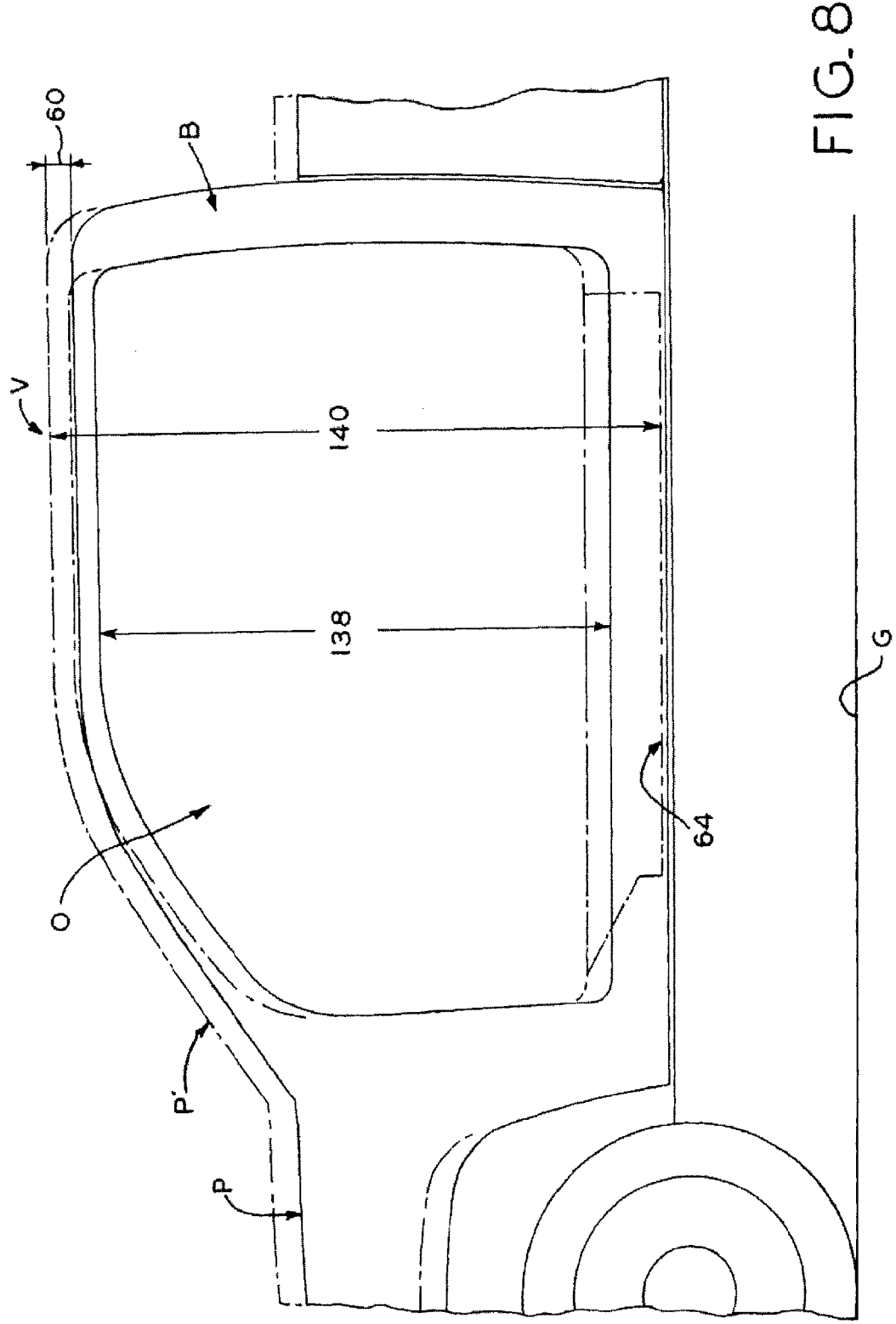
FIG. 8 is a side elevation view of a vehicle prepared to receive a lift mechanism in accordance with the present disclosure with the prepared vehicle outline shown in dashed lines.

With the lowered floor 64 now fully installed in the cutaway space previously created in vehicle body B, vehicle body B is ready to be reinstalled to vehicle frame F. Referring to FIG. 8, vehicle body B is reinstalled to vehicle frame F in a raised or lifted position P' relative to the original position P of vehicle body B on vehicle frame F. In the exemplary embodiment shown in FIGS. 5 and 8 and discussed above, the vertical distance 60 between original and raised positions P, P' may be about 3 inches, which is a standard vehicle lift commonly applied to pickup trucks.

Upon reinstallation of vehicle body B off of the vehicle frame F, vehicle body B is lowered back onto frame F in the same general orientation as when it was removed. However, lowered floor 64 will now come to its resting position near frame F before the other portions of vehicle body B, creating a gap between body B and frame F along forward and aft portions of the frame on the driver side and along the entirety of the frame on the passenger side. As shown in FIGS. 6A and 6B, these gaps are filled with spacers 62, which are appropriately sized based on the raised distance 60 dictated by lowered floor 64 and the amount of frame F removed to provide additional clearance (as discussed below). As shown in FIG. 6A, spacers 62 are placed at front and rear portions of vehicle V, as well as on the passenger side of vehicle V where the floor of vehicle body B has not been lowered.

Optionally, a top portion of frame F may also be cut away (as shown in FIG. 5) to create additional vertical clearance for lowered floor 64, and reinforcing steel members may then be added to a corresponding lower portion of frame F to ensure frame strength commensurate with the "stock" vehicle frame. In an exemplary embodiment, a gap in the top of frame F of about 1-2 inches is created by the cutting away of frame material, and steel reinforcements 68 are welded to frame F. Thus, lowered floor protrudes into the frame gap in frame F by about 1-2 inches, yielding further additional clearance for opening O (as discussed below).

With the lowered floor installed and vehicle body B reinstalled to vehicle frame F in a raised position, wheelchair lift 10 may then be installed within the vehicle cabin. First, lateral actuator assembly 14 is mounted to the original floor of vehicle body B underneath rear seat $ST_R$, as shown in FIGS. 3 and 7 and described above. Vertical actuator assembly 16 and wheelchair support platform 12 are fixed to lateral actuator assembly 14 as discussed above.

Figure 2A:
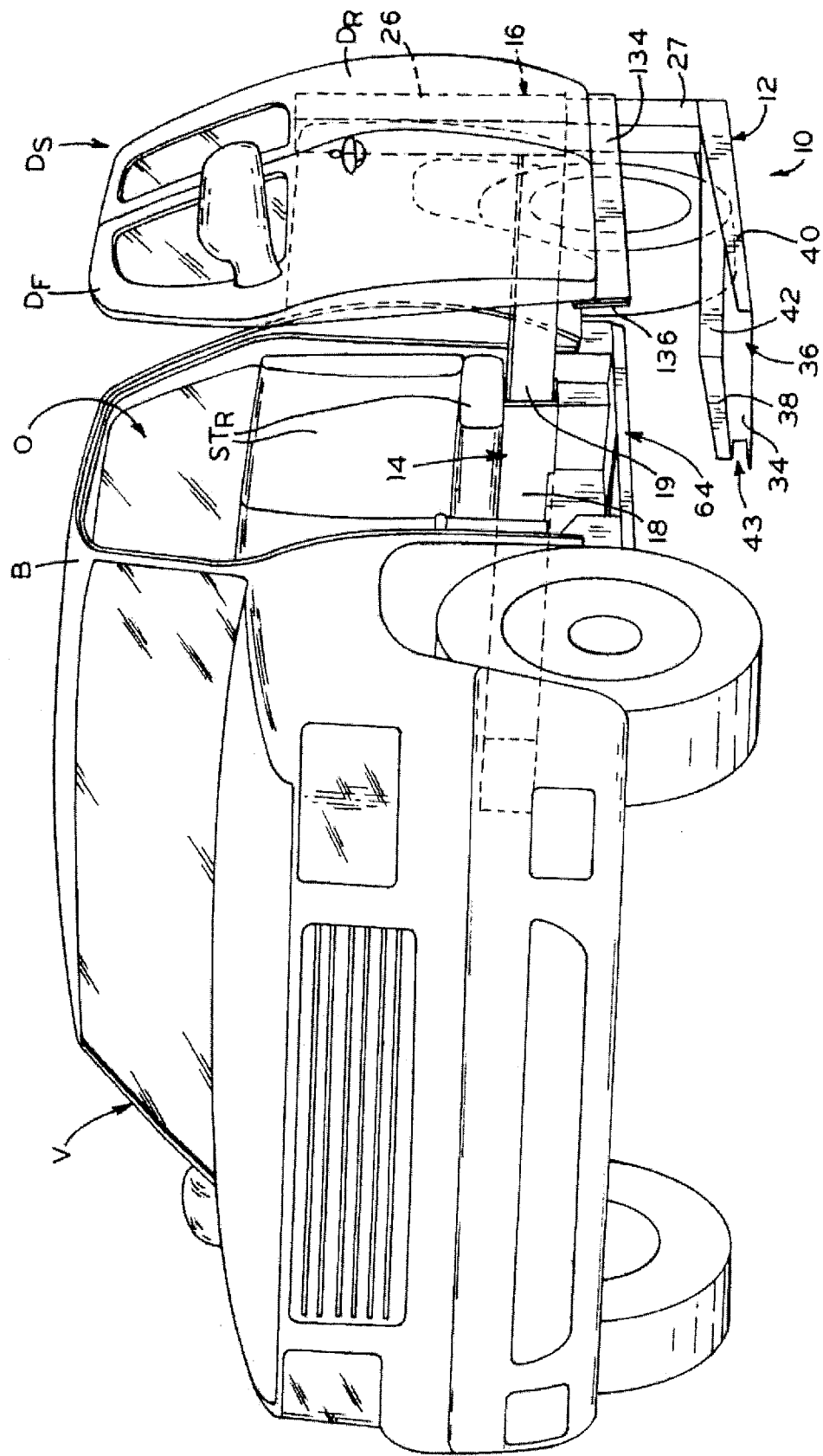
FIG. 2A is a perspective view of the wheelchair lift shown in FIG. 1A installed in the cabin of an extended-cab pickup truck.
Figure 2B:
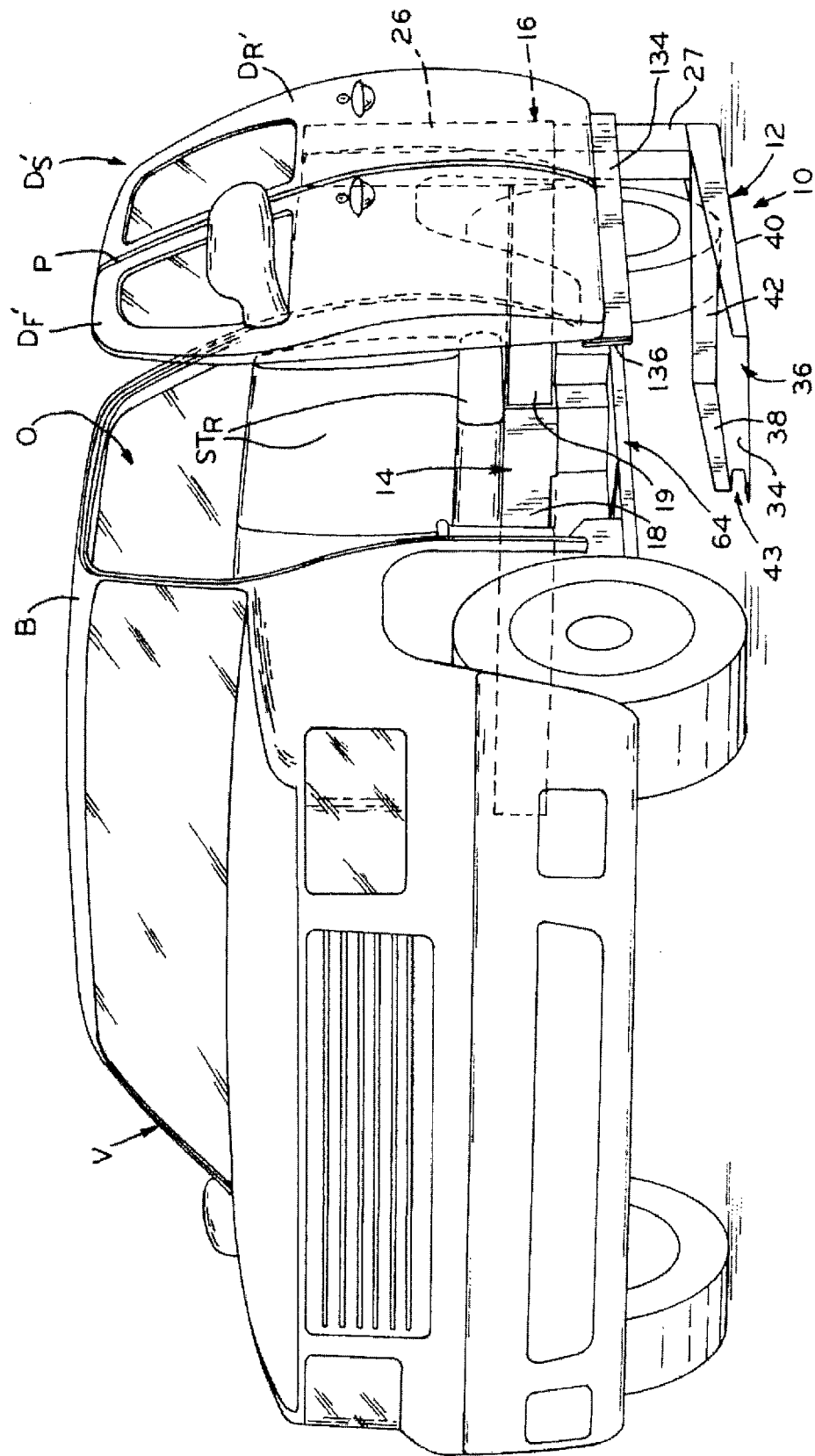
FIG. 2B is a perspective view of the wheelchair lift shown in FIG. 1A installed in the cabin of a crew-cab pickup truck.

Prior to attaching front and rear vehicle doors $D_F$, $D_R$ (or $D_F'$, $D_R'$) one of lateral and vertical actuators 14, 16, the doors are fused to one another to create a single, unitary side door $D_S$ (or $D_S'$) suitable for rigid connection to actuator assemblies 14, 16. In the case of an extended cab pickup truck, as shown in FIG. 2A, front door $D_F$ is welded directly to rear door $D_R$ to create one large side door $D_S$. Referring to FIGS. 2B and 9, a crew cab pickup truck may include front and rear doors $D_F'$, $D_R'$, both of which are full sized doors opening toward the front of the vehicle as noted above. In between front and rear doors $D_F'$, $D_R'$, central pillar P is typically connected to vehicle body B on a standard factory stock vehicle. As noted above, central pillar P is removed together with doors $D_F'$, $D_R'$ prior to installation of lowered floor 64. When preparing single side door $D_S'$, front door $D_F'$ is welded or otherwise fixedly attached to central pillar P, while rear door $D_R'$ is also welded or otherwise fixedly attached to central pillar P. Thus, where side door $D_S'$ includes two full sized doors, central pillar P will typically provided for extra strength and stability of the finished single side door $D_S'$.

Side doors $D_S$, $D_S'$ may also have additional reinforcements for additional strength and rigidity. For example, a steel plate or bar (not shown) may be installed along the interior of front and rear doors $D_F$, $D_R$ (or $D_F'$, $D_R'$) to create a single structure rigidly linking doors $D_F$, $D_R$. In addition, another steel plate may be affixed to the interior of rear door $D_R$ to provide additional structural support and dissipation of concentrated forces at the point of attachment between single side door $D_S$ and lateral actuator arm 19.

As shown in FIGS. 2A and 2B, side doors $D_S$, $D_S'$ may further include door skirt 134 of an appropriate length affixed along the lower edges of front and rear doors $D_F$, $D_R$ or $D_F'$, $D_R'$, which effectively becomes a single edge after the doors are fused into single door $D_S$, $D_S'$. Door skirt 134 ensures complete coverage of the expanded vertical extent 140 (FIG. 8, discussed below) of opening O after the installation of lowered floor 64. Referring specifically to FIG. 2A, door skirt 134 may include lower seal 136 sized and positioned to rest against front step 116, reinforcement 66, and aft original structure 130 (FIG. 3). As shown in FIG. 3, a portion of original vehicle seal S is removed when a portion of vehicle body B cut away to make room for lowered floor 64. Lower seal 136 functions to replace the portion of standard vehicle seal S removed during such modifications.

Finally, side door $D_S$ or $D_S'$ is fixed to vertical actuator housing 27 or lateral actuator arm 19, or both. In the illustrative embodiment of FIG. 5, door $D_S$ or $D_S'$ is coupled to housing 26 by coupling brackets 126. Thus, door $D_S$ or $D_S'$ moves laterally toward or away from vehicle body B with actuation of lateral actuator assembly 14, but does not move vertically with actuation of vertical actuator assembly 16 during raising/lowering procedures as described above.

It is contemplated that various steps in the above description may be performed in a different order. For example, vehicle body B may be lifted from frame F, and spacers 62 installed therebetween, prior to cutting out portions of the original floor and installing lowered floor 64. Moreover, the individual steps of manufacturing vehicle V with wheelchair lift 10 may be performed in any suitable order as required or desired for a particular application.

4. Features and Benefits of the Wheelchair Lift Mechanism

Wheelchair lift 10 used in conjunction with vehicle V offers several advantages, features and benefits over known vehicle wheelchair lift systems. For example, attachment of door $D_S$ to wheelchair lift 10 minimizes the required space for ingress and egress of the operator, because door $D_S$ need only move slightly farther than the width of wheelchair support platform 12. In the exemplary embodiment of FIG. 6A, for example, total lateral movement 142 may be a little as about 22 inches or 26 inches, and as much as about 36 inches or 38 inches, or within any range defined by any of the foregoing values. In an exemplary embodiment, total lateral movement 142 may be equal to about 32 inches, which represents a good balance between adequate clearance for a wide range of wheelchair sizes on the one hand, and reasonable strength and structural rigidity demands on lateral actuator assembly 14 on the other hand. This space requirement is similar to the space required for the swing of a conventional automotive door, thereby allowing an operator to enter and exit a vehicle equipped with wheelchair lift 10 at locations accessible to conventional vehicles. Further, with wheelchair lift 10 in the extended and lowered position (FIGS. 1A and 2A-5) an operator may navigate his or her wheelchair off of wheelchair support platform 12 by simply moving forward, with no rotation of wheelchair lift 12 or turning of the wheelchair required.

Also advantageously, the purely lateral movement of door $D_S$ (or $D_S'$) facilitates a complete and reliable weatherproof seal around opening O when door $D_S$ is seated therein, since door $D_S$ will impinge upon seals S and 136 (FIG. 3) about its perimeter along only one direction of motion. However, other door configurations are contemplated within the scope of the present invention, such as gull-wing doors that are hinged along the top or roof of the cabin or double hinged doors that open at least 90° with a hinge at either a forward or aft location of the cabin.

Advantageously, wheelchair lift 10 is contained entirely within the cabin of vehicle V, and does not extend into the undercarriage space underneath the vehicle. Thus, components of wheelchair lift 10 are protected from environmental degradation or damage in harsh conditions outside the vehicle cabin. Further, pickup trucks and sport utility vehicles including 4-wheel drive systems are compatible with wheelchair lift 10, because the lift components do not extend downwardly into vehicle undercarriage space normally occupied by 4-wheel drive systems such as front differentials, drive train components, transfer cases and the like. This compatibility with 4-wheel drive equipped vehicles allows users of wheelchairs to enjoy the safety and mobility benefits of such vehicles, i.e., during inclement weather or on uneven terrain.

Also advantageously, wheelchair lift 10 occupies minimal cabin space within vehicle V, while vehicle V has an increased vertical clearance and size of opening O. Referring to FIG. 8, for example, it can be seen that opening O has original clearance 138 prior to installation, with expanded vertical clearance 140 after such installation. Expanded vertical clearance 140 may result from raising vehicle body B and/or cutting into frame F to allow extra clearance for lowered floor 64, as discussed above. In addition to these methods of gaining vertical clearance, additional distance is afforded by the low profile of deck 110 of lowered floor 64. For example, in an exemplary embodiment, expanded vertical clearance 140 may be about 3-4 inches may larger than original clearance 138 by locating lowered floor 64 closer to frame F than the "stock" vehicle floor forming a part of vehicle body B.

Thus, in an exemplary embodiment that takes advantage of all three methods of gaining additional vertical clearance described herein, expanded vertical clearance 140 is about 7-9" larger than original clearance 138. Of course, it is contemplated that this range may be somewhat smaller or larger depending on the needs of the user and the vehicle used in conjunction with wheelchair lift 10.

Lowered floor assembly 64 therefore allows relatively large wheelchairs to fit the cabin of vehicle V with minimal changes to the appearance of same, with the raised vehicle body being the only outwardly visible signs of wheelchair lift 10. In the exemplary embodiment of wheelchair lift 10 shown and described herein, tall vehicle operators with even the largest commercially available motorized wheelchairs are easily accommodated in the cabin of a pickup truck having an "extended cab" or "crew cab" configuration. Because a substantial portion of wheelchair lift 10 sits underneath rear passenger seat $ST_R$ (FIG. 7) behind the driver's side and passenger side seating area, there is virtually no change to the functionality and interior capacity of vehicle V.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wheelchair lift system comprising:
a vehicle having a vehicle body including a floor, a passenger side and a driver side, an opening formed in at least one of said passenger and driver sides, the vehicle body defining a vehicle cabin accessible by said opening, said cabin having a front seat positioned in a front seat area and a rear seat positioned in a rear seat area contained therein;
a lateral actuator arm laterally extendable with respect to said vehicle body, said lateral actuator arm moveable between an extended position and a retracted position, said lateral actuator arm disposed underneath the rear seat in the vehicle cabin when said lateral actuator arm is in said retracted position;
a vertical actuator arm coupled to said lateral actuator arm, said vertical actuator arm moveable between said extended position and said retracted position such that said vertical actuator arm is disposed outside said vehicle cabin in said extended position and inside said vehicle cabin in said retracted position, said vertical actuator arm vertically slidable with respect to said lateral actuator arm between a raised position and a lowered position; and
a wheelchair support coupled to said vertical actuator arm, said wheelchair support positioned inside said vehicle and extending into the front seat area when said lateral actuator arm is in said retracted position and said vertical actuator arm is in said raised position, said wheelchair support positioned outside said vehicle when said lateral actuator arm is in said extended position and said vertical actuator arm is in said lowered position.

2. The wheelchair lift system of claim 1, wherein at least a portion of said vehicle body includes a lowered floor assembly on at least one of said passenger side and said driver side, said lowered floor assembly increasing a vertical clearance of said opening as compared to a vertical clearance defined by said floor of said vehicle body.

3. The wheelchair lift system of claim 2, wherein said lowered floor assembly includes a reinforcement member connected to said lowered floor assembly and said vehicle body.

4. The wheelchair lift system of claim 2, wherein said lowered floor assembly comprises:
a floor deck;
a rear wall affixed to a rear edge of the floor deck;
a side wall affixed to an inside edge of the floor deck, and
a front wall affixed to a front edge of the floor deck, such that the floor assembly includes an open outside edge.

5. The wheelchair lift system of claim 4, wherein said lowered floor assembly further comprises a ramp disposed on said floor deck, said ramp including a platform support surface and a ramp surface adapted to guide said wheelchair support between said outside position and said inside position.

6. The wheelchair lift system of claim 4, wherein said lowered floor assembly further comprises a guard, said wheelchair support including a cutout sized to receive said guard when said wheelchair lift system is inside said vehicle cabin.

7. The wheelchair lift system of claim 1, in combination with:
a lateral actuator assembly comprising said lateral actuator arm in combination with a lateral actuator housing coupled to the vehicle body underneath said rear seat in said vehicle cabin, said lateral actuator arm extendable from and retractable into said lateral actuator housing; and
a vertical actuator assembly comprising said vertical actuator arm in combination with a vertical actuator housing coupled to the lateral actuator arm, said vertical actuator arm extendable from and retractable into said vertical actuator housing.

8. The wheelchair lift system of claim 7, wherein said vehicle includes front and rear doors sized and adapted for use with said opening, said front and rear doors fused into a single side door, said single side door coupled to one of said vertical actuator housing and said lateral actuator arm, whereby said single side door moves laterally when said lateral actuator arm moves between said extended and retracted positions.

9. The wheelchair lift system of claim 8, wherein:
at least a portion of said vehicle body includes a lowered floor assembly increasing a vertical clearance of said opening as compared to a vertical clearance defined by said floor of said vehicle body; and
said single side door includes a skirt and lower seal attached along a bottom edge thereof to accommodate and seal against said lowered floor assembly.

10. The wheelchair lift system of claim 7, wherein at least one of said lateral and vertical actuator assemblies includes a linear actuation means positioned within at least one of said lateral and vertical actuator arms.

11. The wheelchair lift system of claim 10, wherein said linear actuation means comprises:
a lead screw operably connected to at least one of said lateral and vertical actuator arms;
a motor coupled to at least one of said lateral and vertical actuator housings; and
a transmission operably connecting said motor to said lead screw.

12. The wheelchair lift system of claim 7, wherein at least one of said lateral and vertical actuator assemblies includes a linear actuator positioned within at least one of said lateral and vertical actuator arms.

13. A wheelchair lift system comprising:
   a vehicle comprising:
      a vehicle frame; and
      a vehicle body including a floor, a passenger side and a driver side, an opening formed in at least one of said passenger and driver sides, the vehicle body defining a vehicle cabin accessible by said opening, said cabin having front and rear seats contained therein;
   a lowered floor on at least one of said passenger side and said driver side of said vehicle body, said lowered floor increasing a vertical clearance as compared to said floor of said vehicle body, said lowered floor offset downwardly as compared to said floor of said vehicle body, said lowered floor establishing a gap between said vehicle body and said vehicle frame such that said vehicle body is raised relative to said vehicle frame to a lifted position relative to an original position of the vehicle body on the vehicle frame, the lifted position spaced a vertical distance from the original position;
   spacers disposed between said vehicle body and said frame, said spacers sized to span said gap; and
   a wheelchair lift coupled to said vehicle body, said wheelchair lift having a raised and retracted configuration and a lowered and extended configuration, whereby a wheelchair supported by said wheelchair lift is disposed inside said vehicle cabin when said wheelchair lift is in said raised and retracted configuration, and the wheelchair supported by said wheelchair lift is disposed outside said vehicle cabin when said wheelchair lift is in said lowered and extended configuration.

14. The wheelchair lift system of claim 13, wherein said lowered floor is a part of a lowered floor assembly including a reinforcement member connected to said lowered floor assembly and said vehicle body.

15. The wheelchair lift system of claim 13, wherein said lowered floor is a part of a lowered floor assembly comprising:
   a floor deck;
   a rear wall affixed to a rear edge of the floor deck;
   a side wall affixed to an inside edge of the floor deck, and
   a front wall affixed to a front edge of the floor deck, such that the floor assembly includes an open outside edge.

* * * * *